United States Patent
Nuggehalli et al.

(10) Patent No.: US 12,245,320 B2
(45) Date of Patent: Mar. 4, 2025

(54) DISCONTINUOUS COVERAGE IN NR NTN AND IOT NTN SYSTEMS

(71) Applicant: APPLE INC., Cupertino, CA (US)

(72) Inventors: Pavan Nuggehalli, Cupertino, CA (US); Alexander Sirotkin, Herzliya (IL); Fangli Xu, Beijing (CN); Haijing Hu, Cupertino, CA (US); Naveen Kumar R Palle Venkata, San Diego, CA (US); Ralf Rossbach, Bavaria-Bayern (DE); Sarma V. Vangala, Cupertino, CA (US); Sethuraman Gurumoorthy, Cupertino, CA (US); Yuqin Chen, Beijing (CN); Zhibin Wu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,697

(22) PCT Filed: Aug. 4, 2021

(86) PCT No.: PCT/CN2021/110567
§ 371 (c)(1),
(2) Date: Sep. 22, 2021

(87) PCT Pub. No.: WO2023/010336
PCT Pub. Date: Feb. 9, 2023

(65) Prior Publication Data
US 2024/0032139 A1    Jan. 25, 2024

(51) Int. Cl.
*H04W 52/02* (2009.01)
*H04W 8/02* (2009.01)
(Continued)

(52) U.S. Cl.
CPC ....... *H04W 76/28* (2018.02); *H04W 52/0225* (2013.01)

(58) Field of Classification Search
CPC ............. H04W 76/28; H04W 52/0225; H04W 52/0216; H04W 52/0219; H04W 52/0229;
(Continued)

(56) References Cited

U.S. PATENT DOCUMENTS

| | | | |
|---|---|---|---|
| 11,223,980 B2 * | 1/2022 | Kim | H04W 48/02 |
| 2015/0148036 A1 * | 5/2015 | Grayson | H04W 8/06 |
| | | | 455/560 |

(Continued)

FOREIGN PATENT DOCUMENTS

| | | |
|---|---|---|
| CN | 102685926 A | 9/2012 |
| CN | 103327642 A | 9/2013 |

(Continued)

OTHER PUBLICATIONS

3GPP TR 28.809, "3rd Generation Partnership Project; Technical Specification Group Services and System Aspects; Management and orchestration; Study on enhancement of Management Data Analytics (MDA) (Release 17)", V17.0.0, Mar. 2021, 96 pages.

(Continued)

*Primary Examiner* — Joseph E Dean, Jr.
(74) *Attorney, Agent, or Firm* — Dorsey & Whitney LLP

(57) ABSTRACT

The functions of user equipment (UE), radio access network (RAN) devices, and core network (CN) devices in circumstances where a UE is expected to experience discontinuous coverage are described herein. A UE may send a CN a non-access stratum (NAS) message including a release request indicating that a UE is leaving coverage and assistance information. The CN may interrupt paging of the UE and resume the paging according to the assistance information. A UE may enter a low power usage mode upon leaving coverage, and may use one or more timers to determine when to check for coverage and send a mobility update message corresponding to the low power usage mode. A (Continued)

base station may receive, from a UE, a radio resource control (RRC) message comprising a release request and assistance information, send an RRC release message to the UE in response, and forward the assistance information to the CN.

15 Claims, 9 Drawing Sheets

(51) Int. Cl.
*H04W 60/04* (2009.01)
*H04W 76/27* (2018.01)
*H04W 76/28* (2018.01)
*H04W 76/30* (2018.01)

(58) Field of Classification Search
CPC ......... H04W 52/0254; H04W 52/0274; H04W 68/02; H04W 8/02; H04W 52/0264; H04W 60/04; H04W 76/27; H04W 76/30; Y02D 30/70
See application file for complete search history.

(56) References Cited

U.S. PATENT DOCUMENTS

| | | | |
|---|---|---|---|
| 2015/0282083 A1* | 10/2015 | Jeong | H04W 76/28 370/311 |
| 2018/0098311 A1 | 4/2018 | Hong et al. | |

FOREIGN PATENT DOCUMENTS

| | | |
|---|---|---|
| WO | 2013144606 A1 | 10/2013 |
| WO | 2017086496 A1 | 5/2017 |

OTHER PUBLICATIONS

Nokia, Nokia Shanghai Bell, "Further discussion on essential parts for IoT-NTN functionality for Rel-17", R2-2105415, 3GPP TSG-RAN WG2 Meeting #114 Electronic, Elbonia, Agenda Item 9.2.1, May 19-27, 2021, 3 pages.

PCT/CN2021/110567, International Search Report and Written Opinion, Apr. 28, 2022, 9 pages.

* cited by examiner

DISCONTINUOUS COVERAGE IN NR NTN AND IOT NTN SYSTEMS

TECHNICAL FIELD

This application relates generally to wireless communication systems, including the functions of user equipment, radio access network (RAN) devices, and core network (CN) devices in circumstances where a UE is expected to experience discontinuous coverage.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G CN (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
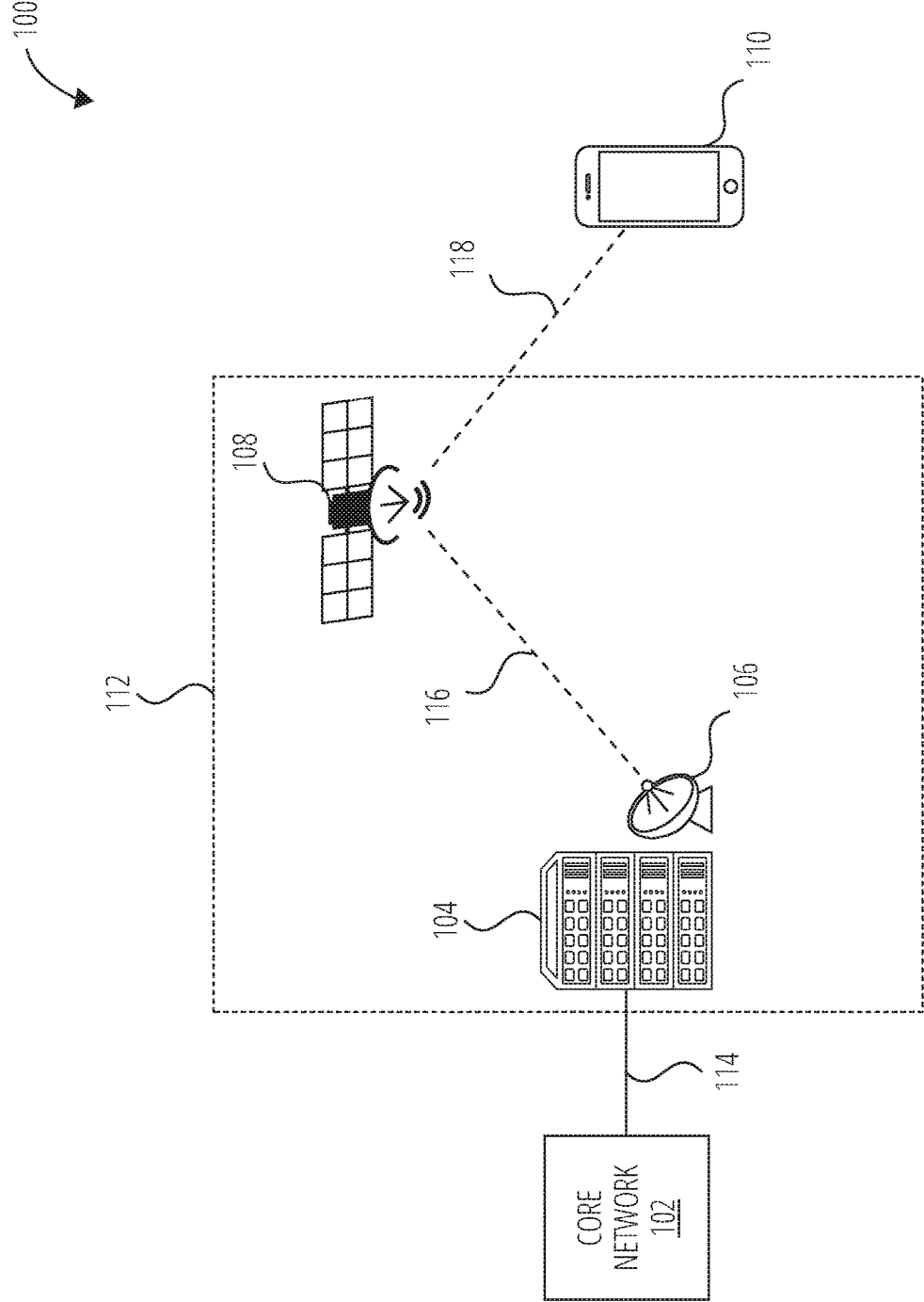
FIG. 1 illustrates a non-terrestrial network (NTN) architecture of a wireless communication system, according to an embodiment.
Figure 2:
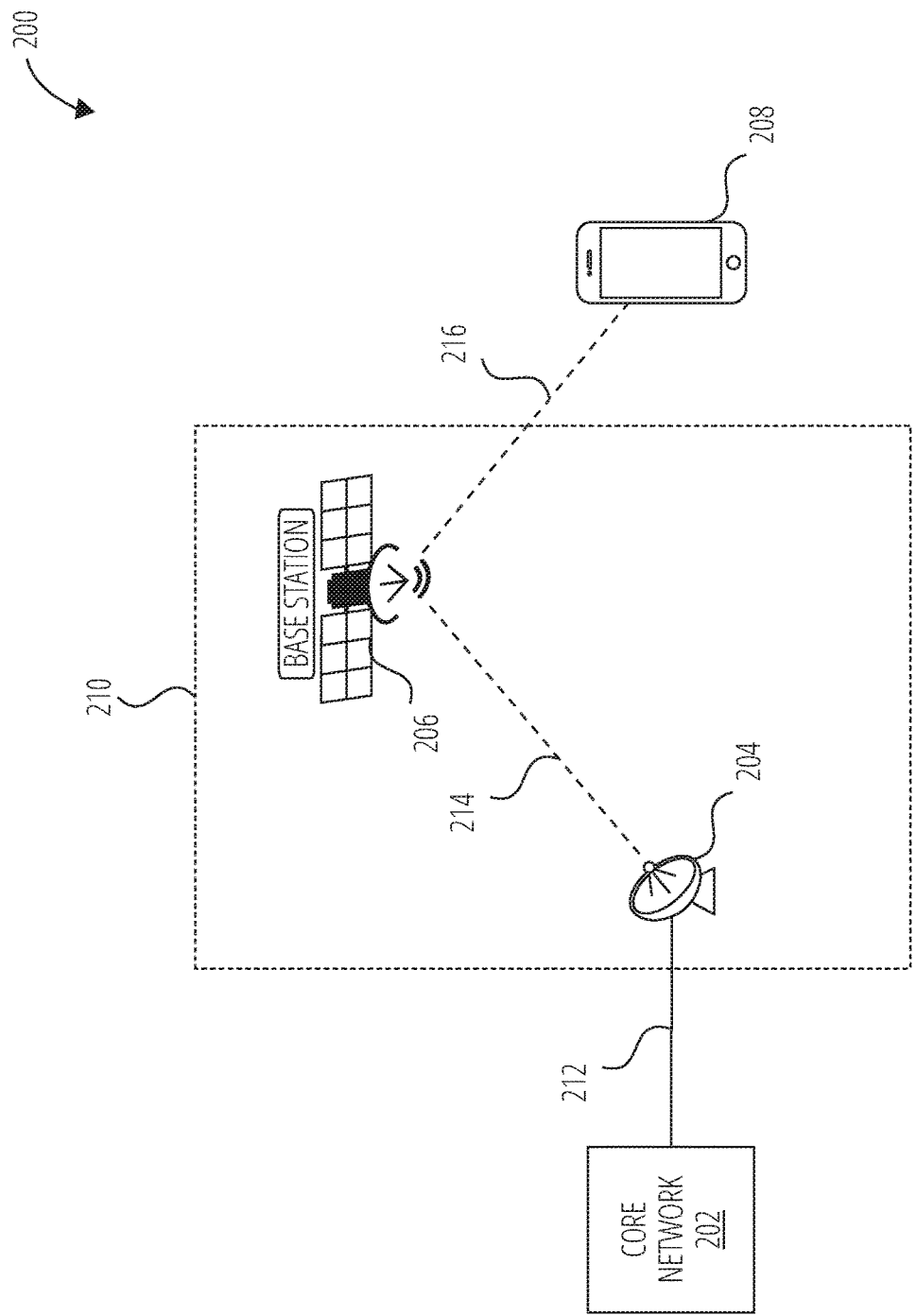
FIG. 2 illustrates an NTN architecture of a wireless communication system, according to an embodiment.

As used herein, the term "base station" may refer to either a terrestrial base station (e.g., as reached by the UE via a satellite as in the terrestrial base station 104 of FIG. 1) or a satellite base station (e.g., a satellite that itself performs base station functionalities as in the satellite base station 206 of FIG. 2).

As used herein, "coverage" may mean that the UE is in a state of being able to communicate with a RAN of a wireless communication system via a cell of the RAN.

FIG. 1 illustrates a non-terrestrial network (NTN) architecture 100 of a wireless communication system, according to an embodiment. The NTN architecture 100 includes a core network (CN) 102, a terrestrial base station 104, a satellite gateway 106, a satellite 108, and a UE 110. The terrestrial base station 104, the satellite gateway 106, and the satellite 108 may be included in a RAN 112.

In some embodiments, the RAN 112 includes E-UTRAN, the CN 102 includes an EPC and the terrestrial base station 104 includes an eNB. In these cases, the CN link 114 connecting the CN 102 and the terrestrial base station 104 may include an S1 interface.

In some embodiments, RAN 112 includes NG-RAN, the CN 102 includes a 5GC and the terrestrial base station 104 includes a gNB or a next generation eNB (ng-eNB). In such cases, the CN link 114 connecting the CN 102 and the terrestrial base station 104 may include an NG interface.

The NTN architecture 100 illustrates a "bent-pipe" or "transparent" satellite based architecture. In such bent-pipe systems, the terrestrial base station 104 uses the satellite gateway 106 to communicate with the satellite 108 over a feeder link 116. The satellite 108 may be equipped with one or more antennas capable of broadcasting a cell according to the RAN 112, and the UE 110 may be equipped with one or more antennas (e.g., a moving parabolic antenna, an omnidirectional phased-array antenna, etc.) capable of communicating with the satellite 108 via a Uu interface on that cell (such communications may be said to use the illustrated service link 118). A payload sited on the satellite 108 then transparently forwards data between the satellite gateway 106 and the UE 110 using the feeder link 116 between the satellite gateway 106 and the satellite 108 and the service link 118 between the satellite 108 and the UE 110. The payload may perform RF conversion and/or amplification in both uplink (UL) and downlink (DL) to enable this communication.

In the embodiment shown in FIG. 1, the terrestrial base station 104 is illustrated without the capability of terrestrial wireless communication directly with a UE. However, it is contemplated that in other embodiments, such a terrestrial base station using the satellite gateway 106 to communicate with the satellite 108 could (also) have this functionality (e.g., as in the terrestrial base station 812 and the terrestrial base station 814 of FIG. 8, to be described below).

FIG. 2 illustrates an NTN architecture 200 of a wireless communication system, according to an embodiment. The NTN architecture 200 includes a CN 202, a satellite gateway 204, a satellite base station 206, and a UE 208. The satellite gateway 204 and the satellite base station 206 may be included in the RAN 210.

In some embodiments, the RAN 210 includes E-UTRAN and the CN 202 includes an EPC. In these cases, the CN link 212 connecting the CN 202 and the satellite gateway 204 may include an S1 interface.

In some embodiments, RAN 210 includes NG-RAN and the CN 202 includes a 5GC. In such cases, the CN link 212 connecting the CN 202 and the satellite gateway 204 may include an NG interface.

The NTN architecture 100 implements a "regenerative" satellite based architecture. In such regenerative systems, the functionalities of a base station are sited on the satellite base station 206, and the communications between these base station functions and the CN 202 occur through a forwarding of interface(s) (e.g., a S1 interface and/or an NG interface) found on the CN link 212 through the satellite gateway 204 and a feeder link 214 to the satellite base station 206. The satellite base station 206 may be equipped with one or more antennas capable of broadcasting a cell according to the RAN 210, and the UE 208 may be equipped with one or more antennas (e.g., a moving parabolic antenna, an omni-directional phased-array antenna, etc.) capable of communicating with the satellite base station 206 via a Uu interface on that cell (such communications may be said to use the illustrated service link 216). A payload sited on the satellite base station 206 then forwards data between the satellite gateway 204 and the UE 208 using the feeder link 214 between the satellite gateway 204 and the satellite base station 206 and the service link 216 between the satellite base station 206 and the UE 208. The payload may perform RF conversion and/or amplification in both uplink (UL) and downlink (DL) to enable this communication, as well as implement the functionalities of the base station (e.g., as an eNB, ng-eNB or a gNB, as corresponding to the type of the RAN 210) as these have been sited on the satellite base station 206.

In embodiments of NTN architectures comprising NG-RAN that also use integrated access and backhaul (IAB), it is possible that a gNB control unit functionality (CU) could be sited terrestrially and may use a satellite gateway to communicate with a satellite that hosts a corresponding gNB donor unit functionality (DU), with the F1 interface(s) between the CU and the DU underpinned by the feeder link 214. In such cases, the CU and the DU may each be understood to be part of the NG-RAN.

In wireless communications systems using NTN architectures (such as those described in relation to FIG. 1 and FIG. 2 above), it may be that coverage holes may exist when the density of satellites used is insufficient to provide cells covering the entire network operator's deployment area.

Such coverage holes may be spatial and/or temporal in nature. An example of a spatial coverage hole may be that a satellite may provide coverage of a first area, and there may not be a second satellite providing a cell to a second area (meaning that the second area is a coverage hole). As a UE using the satellite to communicate moves, it may leave the first area and enter the second area such that it leaves coverage.

Temporal coverage holes may occur due to satellite movement relative to a fixed position on the planetary surface. While some satellites of some NTNs may be placed in a geostationary earth orbit (GEO), this requires placement at a specific radius relative to the earth. Further, this distance is further out that many feasible distances for low earth orbits (LEOs) or medium earth orbits (MEOs) where a satellite could alternatively be placed. Accordingly, due to cost, orbital capacity, and other factors, it is anticipated that (at least some) satellites of (at least some) NTNs may be placed in, for example, LEOs or MEOs (rather than GEOs).

However, a satellite in LEO or MEO (instead of GEO) travels faster than the rotation speed of the earth in order to maintain its orbit. Accordingly, from the perspective of a fixed position on the earth's surface, such a satellite will move (taking any of its cells along with it). This may occur even in the case of quasi-earth fixed cells (where a satellite changes an antenna beam pattern to illuminate a determined portion of the surface while it is moving), as eventually the satellite (due to movement) will be outright unable to reach that portion of the surface. Thus, a UE at that position on the surface may enjoy coverage provided by the satellite when the satellite is in an appropriate location within its orbit to provide a cell at that position, and may lose coverage (fall into a temporal coverage hole) as the satellite moves further along its orbit.

In networks (or portions of networks) implementing terrestrial transmission reception points (TRPs), when a UE leaves coverage provided by a terrestrial TRP (e.g., due to UE mobility), the UE may be configured to continuously/constantly perform cell search. This behavior may be based on an implicit assumption that the UE is relatively likely to soon enter a coverage state associated with the same or another terrestrial TRP in such networks (e.g., due to an underlying assumption that the UE is likely being operated in locations where terrestrial-based coverage is anticipated by the user of the UE).

However, due to the cost and complexity of provisioning satellites for an NTN (as compared to, e.g., providing terrestrial TRPs), the satellite density of the NTN and thus the density of cells corresponding to the satellites of the NTN may be relatively lower than in the network (or portion of the network) using terrestrial TRPs. Accordingly, it may be expected that UEs operating using cells provided by the satellites of NTNs may encounter more frequent and extended periods of time (relative to a typical terrestrial TRP case) where they are out of coverage (due to their entry into the coverage holes described above). Herein, a UE that is expected to experience these (or other) types of frequent and extended periods out of coverage may be said to be experiencing "discontinuous coverage."

It may be that some UE use the satellites of the NTN for coverage (and thus may experience discontinuous coverage) because they are located remotely from established infrastructure supporting terrestrial TRPs. This may motivate a use of lower amounts of power at such a UE (e.g., to conserve a battery of the UE and/or to not overtax a relatively limited power source for the UE such as a small solar panel). It may also be that satellites of the NTN can also benefit from power savings, in that these are also usually supplied with power by more limited power sources that can be available while in orbit, such as batteries and/or solar panels.

In these NTN (and other) circumstances, it may be beneficial to configure one or more elements of the wireless communication system to gracefully suspend/interrupt certain procedures (e.g., cell search/connect/camping procedures at the UE, network paging/communication procedures that use the satellite, etc.) in reaction to a loss of coverage at the UE due to a coverage hole, out of a recognition that there is no point in using power to perform these procedures during periods when communications are in any event not possible.

Then, assuming that an ephemeris for the satellites of the NTN is known at the UE (e.g., via pre-configuration and/or by system information provided by one or more satellites themselves), and that the location and/or mobility of the UE is known to the UE (e.g., via preconfiguration (in the case of a stationary UE) and/or global positioning system (GPS)/global navigation satellite system (GNSS) (in the case of a mobile UE)), it may be that the UE can predict when and/or where it is likely to be in or out of coverage. Accordingly, the UE may preemptively (prior to losing coverage) inform the either/both of a CN (e.g., via non-access stratum (NAS) messages) and/or a base station (e.g., via access stratum (AS) messages, such as radio resource control (RRC) messages) that it is going to lose coverage, and/or when and/or where it will regain coverage. The CN/base station may then accordingly be aware of the later time and/or location at which coverage to the UE is expected to be restored. This time and/or location may be used to restart, at the relevant element (UE, CN, base station) any suspended procedures of the wireless communication system relative to these elements.

In some cases, the UE may send the CN a NAS message comprising a release request in response to a determination, at the UE, that it is going out of coverage. The release request may indicate to the CN that the UE is going out of coverage. In some embodiments, the UE may also send assistance information (e.g., either in the same NAS message comprising the release request, or in a separate message).

In the case of a CN that is an EPC, the NAS message having the release request may be a tracking area update (TAU) message, a service request message, or a generic uplink NAS transport message. In the case of a CN that is a 5GC, the NAS message having the release request may be a mobility registration update (MRU) message, a service request message, or an uplink NAS transport message. Alternatively, a new mobility management (MM) message could be defined and used.

In response to the release request, the CN may, among other things, interrupt any paging of the UE that the CN may otherwise perform. Paging by the CN may include a process whereby the CN (via the RAN) informs the UE that there is available DL data for the UE, with such paging occurring according to a discontinuous reception (DRX) schedule or the like being used at the UE. Due to receiving the release request, the CN is aware that subsequent paging (at least for a time) will not be received at the UE (because the UE is leaving coverage). Accordingly, to save transmission resources within the NTN (e.g., at the satellite), the CN interrupts its paging process.

Later, the CN may resume paging the UE. This resumption may occur according to any assistance information that was received with or corresponding to the NAS message having the release request, as described above. The assistance information may include an outage time duration representing the amount of time that the UE expects to be out of coverage. The UE may calculate this amount of time, in some cases, through the use of the UE location information (e.g., as determined by GPS/GNSS) and satellite ephemeris information for satellites of the NTN. In cases where the UE expects to itself move during the time that it is out of coverage, the UE may also use its current and/or past mobility information (mobility amount, mobility direction), to inform the calculation of this amount of time. In such cases, the CN may resume paging the UE once the outage time duration passes (e.g., relative to the interruption of the UE paging by the CN). The outage time duration may also be useful to the CN in determining the dimensions of any network buffers for the UE.

The assistance information may indicate that the CN should resume paging the UE after an interruption duration (ultimately) determined by the CN. The interruption duration may be determined by the CN based on an indication, from the UE, of an amount of time that the UE expects to be out of coverage. This interruption duration may be determined to be equal to, or greater than, any UE-indicated outage time duration. In such cases, the CN may resume paging the UE once the interruption duration passes (e.g., relative to the interruption of the UE paging by the CN). In some embodiments, the CN sends the UE the interruption duration, which may allow the UE to be aware of when to expect paging to resume (such that it does not waste resources attempting to receive paging during the period that any paging for the UE is interrupted at the CN).

The assistance information may indicate that the CN should resume paging the UE after it receives a TAU message or an MRU message from the UE. In such cases, the network may assume that the UE will be out of coverage until such a time as it is shown otherwise via a reception of the TAU message or the MRU message from the UE. In such cases, the CN may resume paging the UE once a TAU message or a MRU message is received.

The assistance information may indicate a location where the UE is likely to be found where it later enters coverage. This may be particularly beneficial in the case that the UE is expected to move during the period that it is out of coverage. Prior to going out of coverage, the UE may make a current mobility estimate, and determine a location where it is likely to be present when it later enters coverage based on this mobility estimate and the known satellite ephemeris information. In a first case, the UE may provide GPS/GNSS coordinates and a radius (of a circle crawn out with the GPS/GNSS coordinates at the center) corresponding to an area including the location where it is likely to be found when it later enters coverage. The size of the area (e.g., corresponding to the length/size of the radius) so determined may depend on the mobility estimate of the UE (e.g., with a higher mobility estimate corresponding to a larger area/radius). The UE can send GPS/GNSS coordinates and/or the radius that so indicate the location to the CN in the assistance information.

In a second case, the assistance information may indicate the location with a cell index. In other words, the UE may provide, in the assistance information, a cell index (e.g., as mapped to TN cells, or some (other) kind of virtual cell index) for a cell that provides coverage to the location where it is likely to be when it later enters coverage. Once the location where the UE is likely to be found is known at the CN, the CN can resume paging the UE at some later time at that location (e.g., as opposed to some other potentially irrelevant location, thereby reducing the paging burden on the network).

In some embodiments, the assistance information sent by the UE may further include the UE's data treatment preference. This data treatment preference may describe the manner in which the UE prefers the CN treat any DL data for the UE while the UE is out of coverage. For example, it may be that in some cases, the UE prefers that some of all of the DL data for the UE is kept until the UE later enters coverage, such that it can be sent to the UE at that time. In other cases, the UE may prefer that some or all of the DL data for the UE is instead discarded. The CN may accordingly handle the DL data. These indications may be made by the UE to the CN relative to identifications of PDU sessions (5GS) or PDN connections (EPS) for which DL data is to be kept or discarded, as the case may be.

Figure 3:
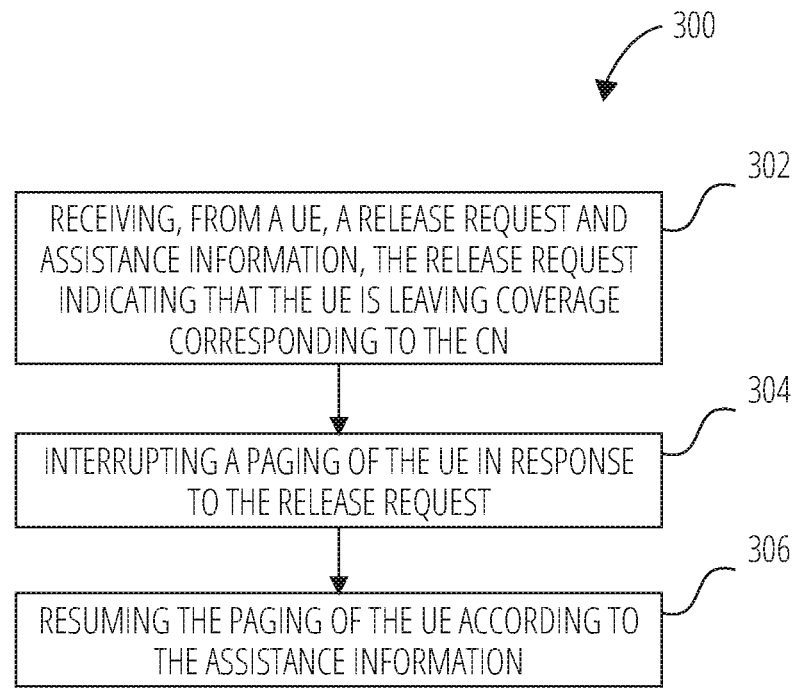
FIG. 3 illustrates a method of a core network, according to an embodiment.

FIG. 3 illustrates a method 300 of a CN, according to an embodiment. The method 300 includes receiving 302, from a UE, a release request and assistance information, the release request indicating that the UE is leaving coverage corresponding to the CN.

The method 300 further includes interrupting 304 a paging of the UE in response to the release request.

The method 300 further includes resuming 306 the paging of the UE according to the assistance information.

In some embodiments of the method 300, the assistance information comprises an outage time duration during which the UE expects to be out of the coverage, and wherein the resuming of the paging of the UE occurs after the outage time duration passes.

In some embodiments of the method 300, the assistance information indicates that the CN should resume the paging after an interruption duration determined by the CN, and wherein the resuming of the paging of the UE occurs after the interruption duration passes. In some of these embodiments, the method 300 further includes sending, to the UE, the interruption duration.

In some embodiments of the method 300, the assistance information indicates that the CN should resume the paging after it receives one of a TAU message and an MRU message from the UE.

In some embodiments of the method 300, the assistance information indicates a location where the UE is likely to be found when it later enters the coverage, and wherein the resuming of the paging of the UE occurs at the location. In some of these embodiments, the location is indicated with a GNSS coordinate. In some of these embodiments, the location is indicated with a GPS coordinate. In some of these embodiments, the location is indicated with a cell index.

In some embodiments of the method 300, the assistance information comprises a data treatment preference for the handling of data for the UE while the UE is out of the coverage, and the method 300 further includes handling the data for the UE while the UE is out of the coverage according to the data treatment preference.

Embodiments contemplated herein include an apparatus comprising means to perform one or more elements of the method 300. This apparatus may be, for example, an apparatus of a CN (such as a CN device 936, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a CN (such as a memory 940 of a CN device 936, as described herein).

Embodiments contemplated herein include an apparatus comprising logic, modules, or circuitry to perform one or more elements of the method 300. This apparatus may be, for example, an apparatus of a CN (such as a CN device 936, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a CN (such as a CN device 936, as described herein).

Embodiments contemplated herein include a signal as described in or related to one or more elements of the method 300.

Embodiments contemplated herein include a computer program or computer program product comprising instructions, wherein execution of the program by a processing element is to cause the processing element to carry out one or more elements of the method 300. The processor may be a processor of a CN (such as a processor(s) 938 of a CN device 936, as described herein). These instructions may be, for example, located in a processor and/or on a memory of the CN (such as processor(s) 938 and memory 940 of a CN device 936, as described herein).

Figure 4:
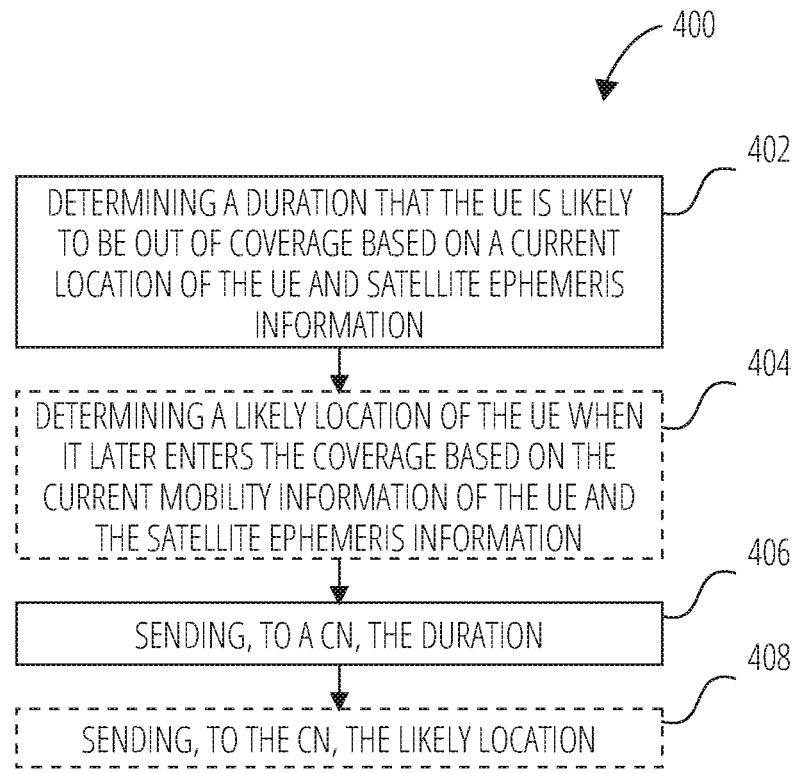
FIG. 4 illustrates a method of a UE, according to an embodiment.

FIG. 4 illustrates a method 400 of a UE, according to an embodiment. The method 400 includes determining 402 duration that the UE is likely to be out of coverage based on a current location of the UE and satellite ephemeris information. In cases of the method 400 where the UE expects to move while it is out of coverage, the determining 402 may further use current mobility information for the UE when determining 402 the duration.

The method 400 further optionally includes determining 404 a likely location of the UE when it later enters coverage based on the current mobility information for the UE and the satellite ephemeris information.

The method 400 further includes sending 406, to a CN, the duration.

Embodiments of the method 400 that include the determining 404 further optionally include sending 408, to the CN, the likely location.

In some embodiments of the method 400 including the sending 408, the likely location is sent to the CN as one or more of GPS coordinates and GNSS coordinates.

In some embodiments of the method 400 including the sending 408, the likely location is sent to the CN as a cell index.

Embodiments contemplated herein include an apparatus comprising means to perform one or more elements of the method 400. This apparatus may be, for example, an apparatus of a UE (such as a wireless device 902 that is a UE, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a UE (such as a memory 906 of a wireless device 902 that is a UE, as described herein).

Embodiments contemplated herein include an apparatus comprising logic, modules, or circuitry to perform one or more elements of the method 400. This apparatus may be, for example, an apparatus of a UE (such as a wireless device 902 that is a UE, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE (such as a wireless device 902 that is a UE, as described herein).

Embodiments contemplated herein include a signal as described in or related to one or more elements of the method 400.

Embodiments contemplated herein include a computer program or computer program product comprising instructions, wherein execution of the program by a processor is to cause the processor to carry out one or more elements of the method 400. The processor may be a processor of a UE (such as a processor(s) 904 of a wireless device 902 that is a UE, as described herein). These instructions may be, for example, located in the processor and/or on a memory of the UE (such as a memory 906 of a wireless device 902 that is a UE, as described herein).

Once the UE leaves coverage, it may be beneficial for the UE to enter a low power usage mode so that less power is used while the UE is out of coverage. As a first example, for a UE that is an LTE device, the low power mode may be a power save mode (PSM). A PSM may be similar to a power-off mode for the UE, in that there is no monitoring of DL transmissions from a base station. However, in PSM, the UE remains registered with the network. Further, the UE may periodically wake up according to a timer in order to send periodic tracking area update (TAU) messages to the CN via the base station.

As another example, for a UE that is a 5G device, the low power mode may be a mobile initiated connection only (MICO) mode. This MICO mode may be similar to the PSM described above (however, with some differences). For the MICO mode, if an AMF of the 5GC in communication with the UE has provided a "strictly periodic registration time indication" to the UE (and assuming that the UE supports the same), the UE periodically wakes up to send a mobility registration update (MRU) message as a timer set for the amount of time in the strictly periodic registration indication message periodically expires while the UE remains in a connection management (CM) idle (CM-IDLE) mode.

A PSM or a MICO mode may be examples of "low power usage modes" as used herein. Further, a TAU message of a PSM and/or an MRU message of a MICO mode may be examples of "mobility update messages" as used herein. Timers that control the (periodic) wakeup timing for a UE in a low power usage mode may be examples of "low power usage timers" as disclosed herein.

For cases where the UE is in a low power usage mode, the UE behavior when the UE finds itself out of coverage when it wakes up in order to send a mobility update message may be unknown/undefined. In such cases where NTN satellites are used for coverage (as described above), it may be beneficial for the UE to avoid unnecessary cell selection/re-selection procedures (e.g., including the sending of such mobility update messages) when it is out of coverage. Because, as described above, it is not necessarily expected in this situation that the UE (may) re-enter a coverage state at any given time (and a time for re-entering coverage, as described above, may not have arrived yet), the use of the power needed to perform these operations has a relatively higher likelihood (as opposed to the terrestrial TRP use case) of being wasted. Accordingly, it may be beneficial to establish methods of waking according to one of the PSM and the MICO mode in NTN discontinuous coverage scenarios in ways that can save power and/or network resources. These methods may be discussed herein as "discontinuous coverage power saving modes."

A UE may indicate support of discontinuous coverage methods/modes in an attach message to the CN and/or in a mobility update message to the CN. Accordingly, the network may be apprised of the UE ability to use a discontinuous coverage power saving mode (e.g., prior to a use by the UE of the discontinuous coverage power saving mode behaviors discussed here, such that the CN is prepared to operate with those behaviors).

In a first case, upon wakeup from a low power usage mode (when a low power usage mode timer expires), a UE first determines whether it is in coverage. If the UE is in coverage, the UE sends the mobility update message. If the UE is not in coverage, the UE does not send the mobility update message. Instead, the UE continuously checks for coverage, and sends the mobility update message when it determines that it has entered coverage.

In a second case, upon wakeup from a low power usage mode (when a low power usage mode timer expires), a UE first determines whether it is in coverage. If the UE is in coverage, the UE sends the mobility update message. If the UE is not in coverage, the UE does not send the mobility update message. Instead, the UE starts a periodic coverage checking timer. Upon each expiration of the coverage checking timer, the UE checks whether it is in coverage, and sends the mobility update message when it determines (according to one of these periodic checks) that it has entered coverage. In between the checks according to the coverage checking time, the UE may return to the low power usage mode.

Figure 5:
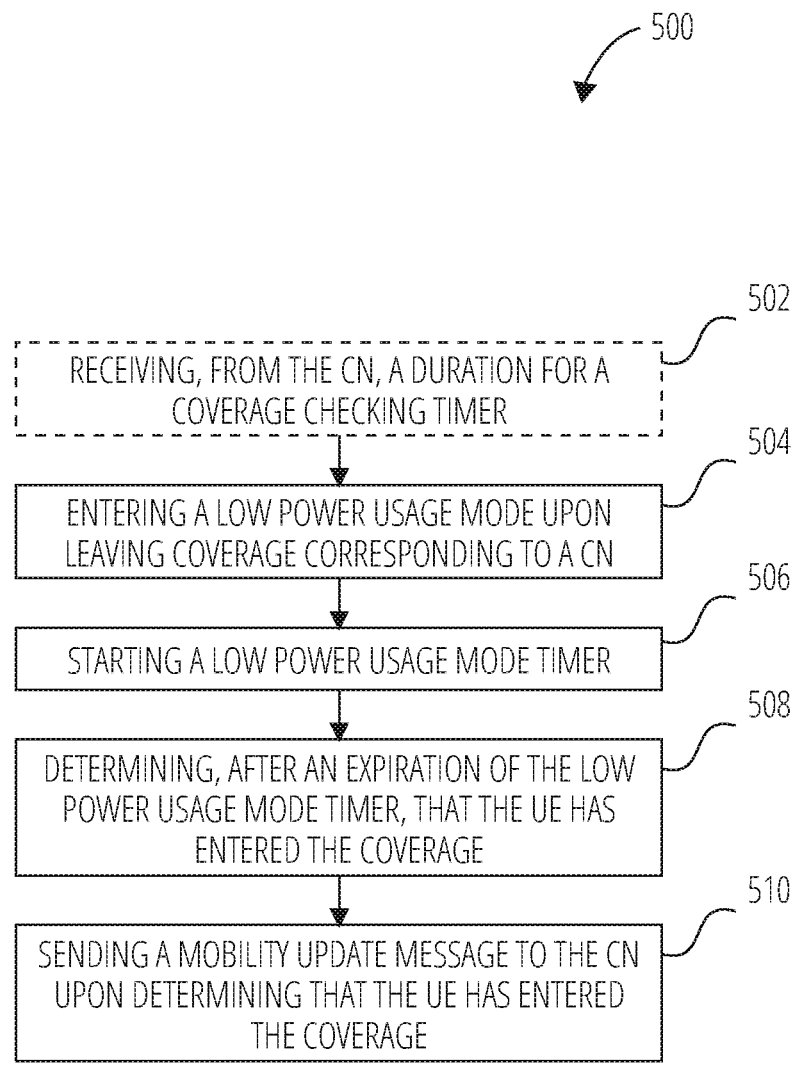
FIG. 5 illustrates a method of a UE, according to an embodiment.

FIG. 5 illustrates a method 500 of a UE, according to an embodiment. The method 500 optionally includes receiving, from a CN, a duration for a coverage checking timer.

The method 500 further includes entering 504 a low power usage mode upon leaving coverage corresponding to a CN.

The method 500 further includes starting 506 a low power usage mode timer.

The method 500 further includes determining 508, after an expiration of the low power usage mode timer, that the UE has entered coverage.

The method 500 further includes sending 510 a mobility update message to the CN upon determining that the UE has entered the coverage.

Some embodiments of the method 500 further include indicating that the UE supports a discontinuous coverage power saving mode.

In some embodiments of the method 500, the determining 508, after the expiration of the low power usage mode timer, that the UE has entered the coverage comprises continuously checking whether the UE has entered the coverage after the expiration of the low power usage mode timer.

In some embodiments of the method 500 that include the receiving 502, the determining 508, after the expiration of the low power usage mode timer, that the UE has entered the coverage comprises checking whether the UE has entered the coverage periodically according to the duration of the coverage checking timer.

In some embodiments of the method 500, the low power usage mode is one of a PSM and a MICO mode.

In some embodiments of the method 500, the mobility update message comprises one of a TAU message and a MRU message.

Embodiments contemplated herein include an apparatus comprising means to perform one or more elements of the method 500. This apparatus may be, for example, an apparatus of a UE (such as a wireless device 902 that is a UE, as described herein).

Embodiments contemplated herein include one or more non-transitory computer-readable media comprising instructions to cause an electronic device, upon execution of the instructions by one or more processors of the electronic device, to perform one or more elements of the method 500. This non-transitory computer-readable media may be, for example, a memory of a UE (such as a memory 906 of a wireless device 902 that is a UE, as described herein).

Embodiments contemplated herein include an apparatus comprising logic, modules, or circuitry to perform one or more elements of the method 500. This apparatus may be, for example, an apparatus of a UE (such as a wireless device 902 that is a UE, as described herein).

Embodiments contemplated herein include an apparatus comprising: one or more processors and one or more computer-readable media comprising instructions that, when executed by the one or more processors, cause the one or more processors to perform one or more elements of the method 500. This apparatus may be, for example, an apparatus of a UE (such as a wireless device 902 that is a UE, as described herein).

Embodiments contemplated herein include a signal as described in or related to one or more elements of the method 500.

Embodiments contemplated herein include a computer program or computer program product comprising instructions, wherein execution of the program by a processor is to cause the processor to carry out one or more elements of the method 500. The processor may be a processor of a UE (such as a processor(s) 904 of a wireless device 902 that is a UE, as described herein). These instructions may be, for example, located in the processor and/or on a memory of the UE (such as a memory 906 of a wireless device 902 that is a UE, as described herein).

In some cases, a UE may send a base station an RRC message including a release request in response to a determination, at the UE, that it is going out of coverage. The release request may indicate to the base station that the UE is going out of coverage. It is contemplated that the coverage being left could be a coverage provided by the RAN itself, or more generally any coverage provided by any RAN of an associated CN.

In some cases, such an RRC message may be a new RRC message developed for this use. It is also contemplated that a pre-existing RRC message may be modified for this use. For example, a UEAssistanceInformation message may be modified to include the release request so that it may be used for this purpose.

In response to the receipt of the release request in the RRC message, the RAN may release the UE to an RRC idle mode or (in the case where the UE is connected through the RAN to a 5GC) an RRC inactive mode.

In the case where the RRC idle mode is used, the RAN may also indicate a time duration for which the UE is not required to perform cell selection/re-selection methods (e.g., including cell measurements and/or monitoring of control channels).

In the case where the RRC inactive mode is used, the RAN may (additionally, or alternatively) indicate a future time at which it intends to resume RAN paging. This may allow the UE to pause any attempt to interact with the RAN until that time (such that power that would have been used for this purpose during that time may be saved).

When the base station receives the RRC message, it may further inform the CN to which the UE connects through the RAN to suspend the connection to the UE.

In some cases, the RRC message may also include assistance information. This assistance information may in some cases be similar to that described above in relation to NAS messaging. For a first example, this assistance information may indicate an outage time duration during which the UE expects to be out of coverage. As another example, the assistance information may indicate a location where the UE is likely to be found when it later enters coverage. As another example, the assistance information may indicate a data treatment preference for the handling of data for the UE while the UE is out of coverage. As another example, the assistance information may indicate that the CN should resume paging after an interruption duration determined by the CN (e.g., as potentially informed by a UE recommendation for that value, in the manner described above). Each of these items of assistance information may be presented by the UE according to the manner previously described.

Then, when the base station receives the RRC message, the RAN (e.g., via the base station) may indicate to the CN that the UE has made the release request, such that, for example, unnecessary paging (from the CN) can be dropped according to this assistance information (as previously discussed). Any relevant assistance information may be forwarded by the RAN (e.g., via the base station) to the CN.

In some embodiments, the decision to trigger the RRC message may be made at the UE and may be based on UE implementation. In some embodiments, the RAN may control when the UE can trigger the RRC message. For example, the RAN may send the UE a condition messaging having one or more conditions according to which the UE may (or should) perform the sending of the RRC message. The sending of the RRC message may then be performed at the UE according to the condition(s) (e.g., the RRC message may be sent if the condition(s) are met). RAN control of conditions when the UE can trigger the RRC message may, for example, simplify implementation of these methods for operators of NTNs and/or help them maintain control of such NTNs generally.

In a first example, a condition may be that the UE is at a location indicated by the condition message. For example, the condition message may indicate a set of GPS and/or GNSS coordinates and a radius. The UE may accordingly trigger the RRC message if it is inside of a circle corresponding to the measurement of the radius amount outward from the GPS and/or GNSS coordinates.

In a second example, a condition may be that a current time maps to a time indication in the condition message. For example, the condition message may include a time indication (e.g., 6 PM to 12 PM every Monday). The UE may accordingly trigger the RRC message if a current time (as determined at the UE) maps to the time indication (e.g., if the UE determines that is between 6 PM and 12 PM on a Monday). It is contemplated that a time indication may be given using time (e.g., corresponding to single time or a range of times), days of the week, months of the year, years, etc. and/or any combination of these.

It is contemplated that these uses of the RRC message may be implemented for either/both NR NTNs and in LTE systems using NTNs, such as an LTE-based IoT NTN network.

Figure 6:
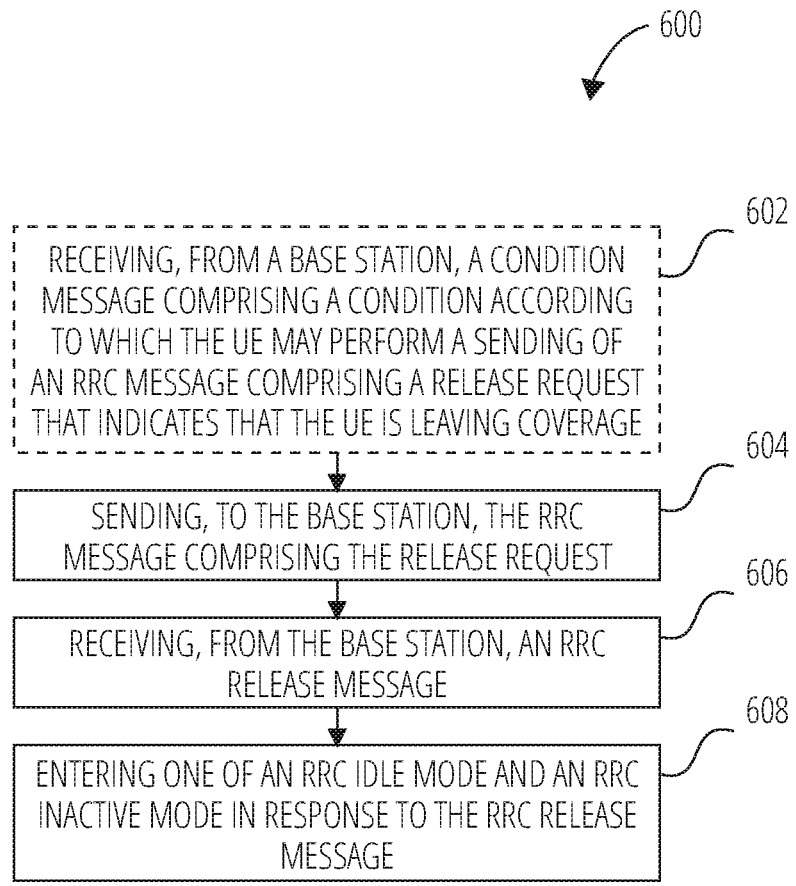
FIG. 6 illustrates a method of a UE, according to an embodiment.

FIG. 6 illustrates a method 600 of a UE, according to an embodiment. The method 600 optionally includes receiving 602, from a base station, a condition message comprising a condition according to which the UE may perform a sending of an RRC message comprising a release request that indicates that the UE is leaving coverage.

The method 600 further includes sending 604, to the base station, the RRC message comprising the release request. In embodiments of the method 600 that include the receiving 602, the sending 604 is performed according to the condition.

The method 600 further includes receiving 606, from the base station, an RRC release message.

The method 600 further includes entering 608 one of an RRC idle mode and an RRC inactive mode in response to the RRC release message.

In some embodiments of the method 600, the RRC message is a UEAssistanceInformation message In some embodiments of the method 600, the RRC release message indicates a duration during which the UE is not expected to perform cell selection methods.

In some embodiments of the method 600, the one of the RRC idle mode and the RRC inactive mode comprises the RRC inactive mode, and the RRC release message indicates a time at which a RAN of the base station intends to resume RAN paging.

In some embodiments of the method 600, the RRC message includes assistance information indicating an outage time duration during which the UE expects to be out of the coverage.

In some embodiments of the method 600, the RRC message includes assistance information indicating a location where the UE is likely to be found when it later enters the coverage.

In some embodiments of the method 600, the RRC message includes assistance information indicating a data treatment preference for the handling of data for the UE while the UE is out of the coverage.

In some embodiments of the method 600, the RRC message includes assistance information indicating that a CN corresponding to the base station should resume paging after an interruption duration determined by the CN.

In some embodiments of the method 600 that include the receiving 602, the condition is that the UE is at a location indicated by the condition message.

In some embodiments of the method 600 that include the receiving 602, the condition is that a current time maps to a time indication in the condition message.

Embodiments contemplated herein include an apparatus comprising means to perform one or more elements of the method 600. This apparatus may be, for example, an apparatus of a UE (such as a wireless device 902 that is a UE, as described herein).

Embodiments contemplated herein include one or more non-transitory computer-readable media comprising instructions to cause an electronic device, upon execution of the instructions by one or more processors of the electronic device, to perform one or more elements of the method 600. This non-transitory computer-readable media may be, for example, a memory of a UE (such as a memory 906 of a wireless device 902 that is a UE, as described herein).

Embodiments contemplated herein include an apparatus comprising logic, modules, or circuitry to perform one or more elements of the method 600. This apparatus may be, for example, an apparatus of a UE (such as a wireless device 902 that is a UE, as described herein).

Embodiments contemplated herein include an apparatus comprising: one or more processors and one or more computer-readable media comprising instructions that, when executed by the one or more processors, cause the one or more processors to perform one or more elements of the method 600. This apparatus may be, for example, an apparatus of a UE (such as a wireless device 902 that is a UE, as described herein).

Embodiments contemplated herein include a signal as described in or related to one or more elements of the method 600.

Embodiments contemplated herein include a computer program or computer program product comprising instructions, wherein execution of the program by a processor is to cause the processor to carry out one or more elements of the method 600. The processor may be a processor of a UE (such as a processor(s) 904 of a wireless device 902 that is a UE, as described herein). These instructions may be, for example, located in the processor and/or on a memory of the UE (such as a memory 906 of a wireless device 902 that is a UE, as described herein).

Figure 7:
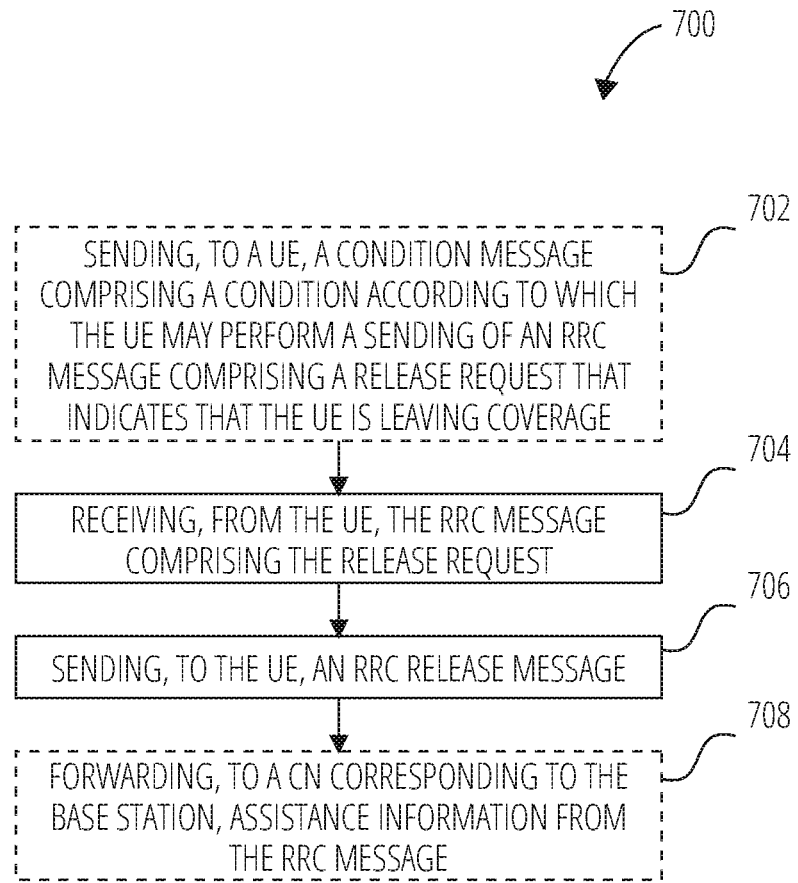
FIG. 7 illustrates a method of a base station, according to an embodiment.

FIG. 7 illustrates a method 700 of a base station, according to an embodiment. The method 700 optionally includes sending 702, to a UE, a condition message comprising a condition according to which the UE may perform a sending of an RRC message comprising a release request that indicates that the UE is leaving coverage.

The method 700 further includes receiving 704, from the UE, the RRC message comprising the release request.

The method 700 further includes sending 706, to the UE, an RRC release message.

The method 700 further optionally includes forwarding 708, to a CN corresponding to the base station, assistance information from the RRC message.

In some embodiments of the method 700, the RRC message is a UEAssistanceInformation message.

In some embodiments of the method 700 the RRC release message indicates a duration during which the UE is not expected to perform cell selection methods.

In some embodiments of the method 700 the RRC release message indicates a time at which a RAN of the base station intends to resume RAN paging.

In some embodiments of the method 700 including the forwarding 708, the assistance information from the RRC message indicates an outage time duration during which the UE expects to be out of the coverage.

In some embodiments of the method 700 including the forwarding 708, the assistance information from the RRC message indicates a location where the UE is likely to be found when it later enters the coverage.

In some embodiments of the method 700 including the forwarding 708, the assistance information from the RRC message indicates a data treatment preference for the handling of data for the UE while the UE is out of the coverage.

In some embodiments of the method 700 including the forwarding 708, the assistance information from the RRC message indicates that the CN should resume paging after an interruption duration determined by the CN.

In some embodiments of the method 700 that include the sending 702, the condition is that the UE is at a location indicated by the condition message.

In some embodiments of the method 700, that include the sending 702, the condition is that a current time maps to a time indication in the condition message.

Embodiments contemplated herein include an apparatus comprising means to perform one or more elements of the method 700. This apparatus may be, for example, an apparatus of a base station (such as a RAN device 918 that is a base station, as described herein).

Embodiments contemplated herein include one or more non-transitory computer-readable media comprising instructions to cause an electronic device, upon execution of the instructions by one or more processors of the electronic device, to perform one or more elements of the method 700. This non-transitory computer-readable media may be, for example, a memory of a base station (such as a memory 922 of a RAN device 918 that is a base station, as described herein).

Embodiments contemplated herein include an apparatus comprising logic, modules, or circuitry to perform one or more elements of the method 700. This apparatus may be, for example, an apparatus of a base station (such as a RAN device 918 that is a base station, as described herein).

Embodiments contemplated herein include an apparatus comprising: one or more processors and one or more computer-readable media comprising instructions that, when executed by the one or more processors, cause the one or more processors to perform one or more elements of the method 700. This apparatus may be, for example, an apparatus of a base station (such as a RAN device 918 that is a base station, as described herein).

Embodiments contemplated herein include a signal as described in or related to one or more elements of the method 700.

Embodiments contemplated herein include a computer program or computer program product comprising instructions, wherein execution of the program by a processing element is to cause the processing element to carry out one or more elements of the method 700. The processor may be a processor of a base station (such as a processor(s) 920 of a RAN device 918 that is a base station, as described herein). These instructions may be, for example, located in the processor and/or on a memory of the base station (such as a memory 922 of a RAN device 918 that is a base station, as described herein).

Figure 8:
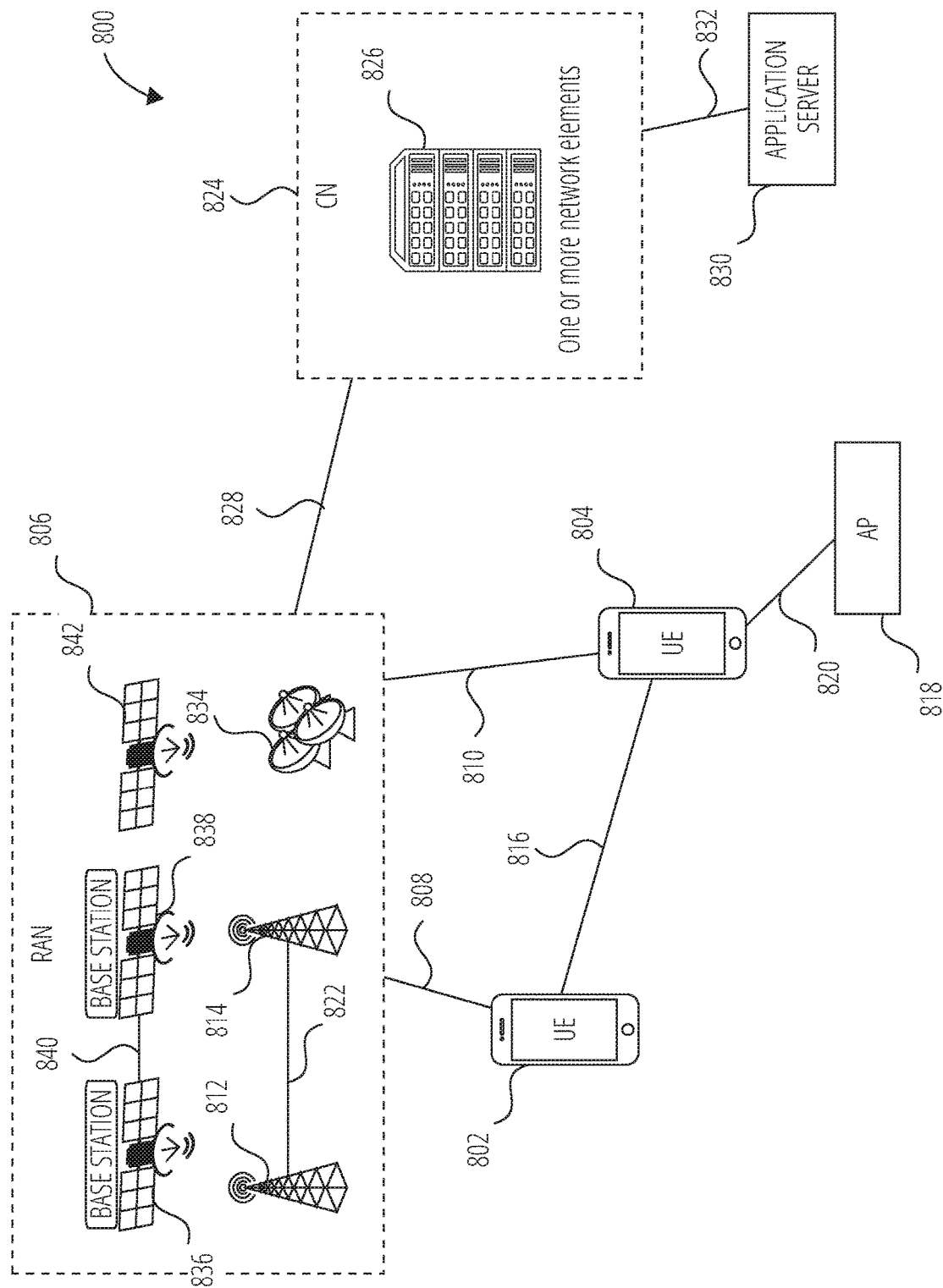
FIG. 8 illustrates an example architecture of a wireless communication system, according to embodiments disclosed herein.

FIG. 8 illustrates an example architecture of a wireless communication system 800, according to embodiments disclosed herein. The following description is provided for an example wireless communication system 800 that operates in conjunction with the LTE system standards and/or 5G or NR system standards as provided by 3GPP technical specifications and other 3GPP documents.

As shown by FIG. 8, the wireless communication system 800 includes UE 802 and UE 804 (although any number of UEs may be used). In this example, the UE 802 and the UE 804 are illustrated as smartphones (e.g., handheld touchscreen mobile computing devices connectable to one or more cellular networks), but may also comprise any mobile or non-mobile computing device configured for wireless communication.

The UE 802 and UE 804 may be configured to communicatively couple with a RAN 806. In embodiments, the RAN 806 may be NG-RAN, E-UTRAN, etc. The UE 802 and UE 804 utilize connections (or channels) (shown as connection 808 and connection 810, respectively) with the RAN 806, each of which comprises a physical communications interface. The RAN 806 can include one or more base stations (such as terrestrial base station 812, the terrestrial base station 814 the satellite base station 836 and the satellite base station 838) and/or other entities (e.g., the satellite 842, which may not have base station functionality) that enable the connection 808 and connection 810. One or more satellite gateways 834 may integrate the satellite base station 836, satellite base station 838, and/or the satellite 842 into the RAN 806, in the manners (and with the appropriate elements) described in relation to the NTN architecture 100 of FIG. 1 and the NTN architecture 200 of FIG. 2.

In this example, the connection 808 and connection 810 are air interfaces to enable such communicative coupling, and may be consistent with RAT(s) used by the RAN 806, such as, for example, an LTE and/or NR. It is contemplated that the connection 808 and connection 810 may include, in some embodiments, service links between their respective UE 802, UE 804 and one or more of the satellite base station 836, the satellite base station 838, and the satellite 842.

In some embodiments, the UE 802 and UE 804 may also directly exchange communication data via a sidelink interface 816.

The UE 804 is shown to be configured to access an access point (shown as AP 818) via connection 820. By way of example, the connection 820 can comprise a local wireless connection, such as a connection consistent with any IEEE 802.11 protocol, wherein the AP 818 may comprise a Wi-Fi® router. In this example, the AP 818 may be connected to another network (for example, the Internet) without going through a CN 824.

In embodiments, the UE 802 and UE 804 can be configured to communicate using orthogonal frequency division multiplexing (OFDM) communication signals with each other, with the terrestrial base station 812, the terrestrial base station 814, the satellite base station 836, the satellite base station 838, and/or the satellite 842 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the terrestrial base station 812, terrestrial base station 814, the satellite base station 836 and/or the satellite base station 838 may be implemented as one or more software entities running on server computers as part of a virtual network.

In addition, or in other embodiments, the terrestrial base station 812 or terrestrial base station 814 may be configured to communicate with one another via interface 822. In embodiments where the wireless communication system 800 is an LTE system (e.g., when the CN 824 is an EPC), the interface 822 may be an X2 interface. The X2 interface may be defined between two or more base stations (e.g., two or more eNBs and the like) that connect to an EPC, and/or between two eNBs connecting to the EPC. It is contemplated than an inter-satellite link (ISL) may carry the X2 interface between in the case of two satellite base stations.

In embodiments where the wireless communication system 800 is an NR system (e.g., when CN 824 is a 5GC), the interface 822 may be an Xn interface. An Xn interface is defined between two or more base stations that connect to 5GC (e.g., CN 824). For example, the Xn interface may be between two or more gNBs that connect to 5GC, a gNB connecting to 5GC and an eNB, between two eNBs connecting to 5GC, and/or two or more satellite base stations via an ISL (as in, e.g., the interface 840 between the satellite base station 836 and the satellite base station 838).

The RAN 806 is shown to be communicatively coupled to the CN 824. The CN 824 may comprise one or more network elements 826, which are configured to offer various data and telecommunications services to customers/subscribers (e.g., users of UE 802 and UE 804) who are connected to the CN 824 via the RAN 806. The components of the CN 824 may be implemented in one physical device or separate physical devices including components to read and execute instructions from a machine-readable or computer-readable medium (e.g., a non-transitory machine-readable storage medium). For example, the components of the CN 824 may be implemented in one or more processors and/or one or more associated memories.

In embodiments, the CN 824 may be an EPC, and the RAN 806 may be connected with the CN 824 via an S1 interface 828. In embodiments, the S1 interface 828 may be split into two parts, an S1 user plane (S1-U) interface, which carries traffic data between the terrestrial base station 812, terrestrial base station 814, the satellite base station 836, or the interface 840 and a serving gateway (S-GW), and the S1-MME interface, which is a signaling interface between the terrestrial base station 812, the terrestrial base station 814 the satellite base station 836, or the interface 840 and mobility management entities (MMEs).

In embodiments, the CN 824 may be a 5GC, and the RAN 806 may be connected with the CN 824 via an NG interface 828. In embodiments, the NG interface 828 may be split into two parts, an NG user plane (NG-U) interface, which carries traffic data between the terrestrial base station 812, terrestrial base station 814, satellite base station 836, or satellite base station 838 and a user plane function (UPF), and the S1 control plane (NG-C) interface, which is a signaling interface between the terrestrial base station 812, terrestrial base station 814 satellite base station 836, or satellite base station 838 and access and mobility management functions (AMFs).

Generally, an application server 830 may be an element offering applications that use internet protocol (IP) bearer resources with the CN 824 (e.g., packet switched data services). The application server 830 can also be configured to support one or more communication services (e.g., VoIP sessions, group communication sessions, etc.) for the UE 802 and UE 804 via the CN 824. The application server 830 may communicate with the CN 824 through an IP communications interface 832.

Figure 9:
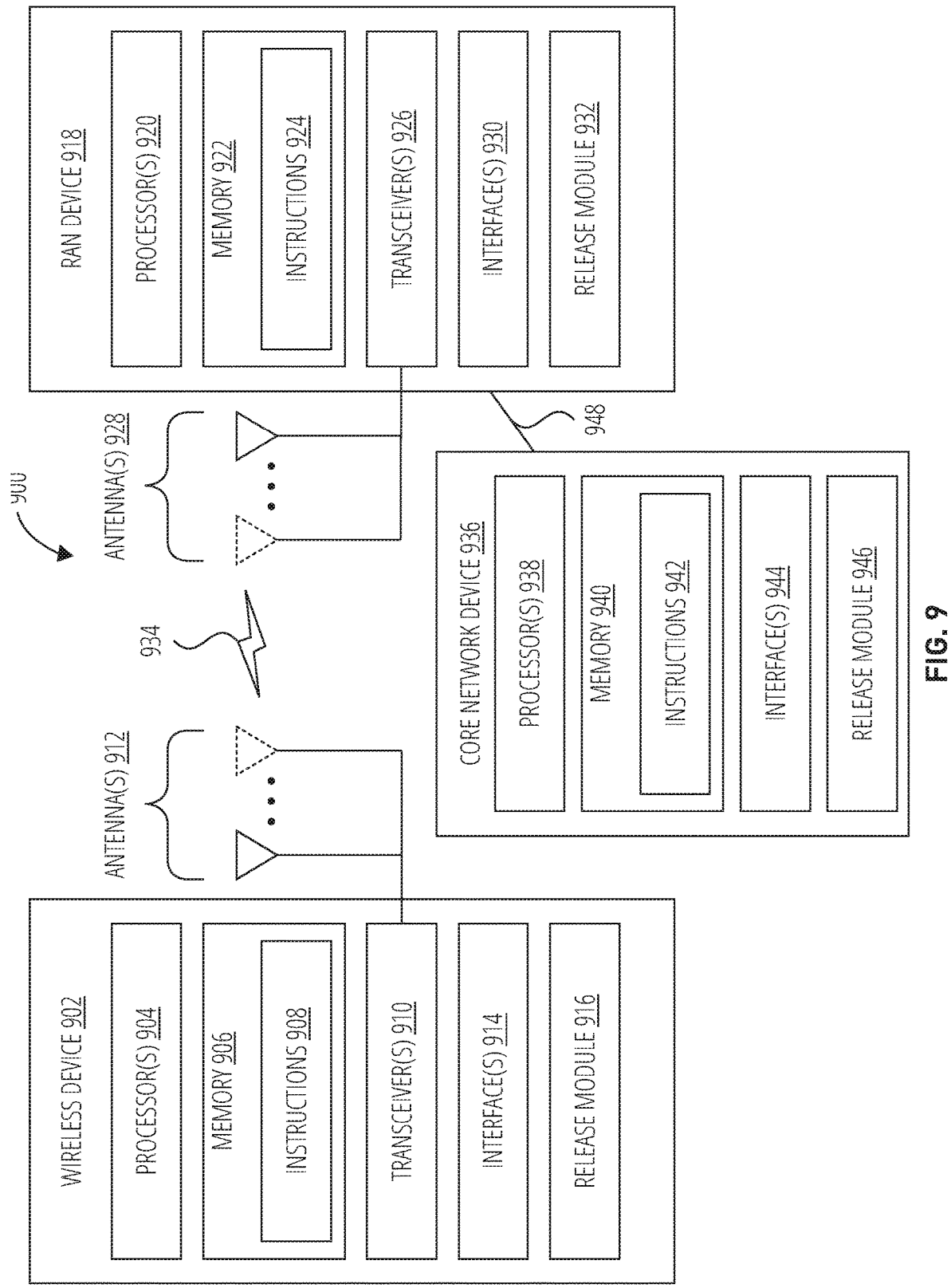
FIG. 9 illustrates a system for performing signaling between a wireless device and a RAN device connected to a core network of a CN device, according to embodiments disclosed herein.

FIG. 9 illustrates a system 900 for performing signaling 934 between a wireless device 902 and a RAN device 918 connected to a core network of a CN device 936, according to embodiments disclosed herein. The system 900 may be a portion of a wireless communications system as herein described. The wireless device 902 may be, for example, a UE of a wireless communication system. The RAN device 918 may be, for example, a base station (e.g., an eNB or a gNB) of a wireless communication system that is a terrestrial base station or a satellite base station. The CN device 936 may be one or more devices making up a CN, as described herein.

The wireless device 902 may include one or more processor(s) 904. The processor(s) 904 may execute instructions such that various operations of the wireless device 902 are performed, as described herein. The processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 902 may include a memory 906. The memory 906 may be a non-transitory computer-readable storage medium that stores instructions 908 (which may include, for example, the instructions being executed by the processor(s) 904). The instructions 908 may also be referred to as program code or a computer program. The memory 906 may also store data used by, and results computed by, the processor(s) 904.

The wireless device 902 may include one or more transceiver(s) 910 that may include radio frequency (RF) transmitter and/or receiver circuitry that use the antenna(s) 912 of the wireless device 902 to facilitate signaling (e.g., the signaling 934) to and/or from the wireless device 902 with other devices (e.g., the RAN device 918) according to corresponding RATs. In some embodiments, the antenna(s) 912 may include a moving parabolic antenna, an omnidirectional phased-array antenna, or some other antenna suitable for communication with a satellite, (e.g., as described above in relation to the UE 110 of FIG. 1 and the UE 208 of FIG. 2).

For a RAN device 918 that is a terrestrial base station, the network device signaling 934 may occur on a feeder link between the wireless device 902 and a satellite and a service link between the satellite and the RAN device 918 (e.g., as described in relation to FIG. 1). For a RAN device 918 that is a satellite base station, the signaling 934 may occur on a feeder link between the wireless device 902 and the RAN device 918 (e.g., as described in relation to FIG. 2).

The wireless device 902 may include one or more antenna(s) 912 (e.g., one, two, four, or more). For embodiments with multiple antenna(s) 912, the wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 902 may be accomplished according to precoding (or digital beamforming) that is applied at the wireless device 902 that multiplexes the data streams across the antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 902 may implement analog beamforming techniques, whereby phases of the signals sent by the antenna(s) 912 are relatively adjusted such that the (joint) transmission of the antenna(s) 912 can be directed (this is sometimes referred to as beam steering).

The wireless device 902 may include one or more interface(s) 914. The interface(s) 914 may be used to provide input to or output from the wireless device 902. For example, a wireless device 902 that is a UE may include interface(s) 914 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 910/antenna(s) 912 already described) that allow for communication between the UE and other devices and may operate according to known protocols (e.g., Wi-Fi®, Bluetooth®, and the like).

The wireless device 902 may include a release module 916. The release module 916 may be implemented via hardware, software, or combinations thereof. For example, the release module 916 may be implemented as a processor, circuit, and/or instructions 908 stored in the memory 906 and executed by the processor(s) 904. In some examples, the release module 916 may be integrated within the processor(s) 904 and/or the transceiver(s) 910. For example, the release module 916 may be implemented by a combination of software components (e.g., executed by a DSP or a general processor) and hardware components (e.g., logic gates and circuitry) within the processor(s) 904 or the transceiver(s) 910.

The release module 916 may be used for various aspects of the present disclosure, for example, aspects of FIG. 3 through FIG. 7. The release module 916 is configured to for example, generate NAS messages to be sent to a core network (which may include a release request and/or assistance information); determine whether a UE is out of coverage, enter a low power usage mode, implement one or more timers such as a low power usage mode timer and/or a coverage checking timer, and generate a mobility update message for a CN after the UE returns to coverage; and/or generate RRC messages to be sent to a base station (which may include a release request and/or assistance information), etc., as described herein.

The RAN device 918 may include one or more processor(s) 920. The processor(s) 920 may execute instructions such that various operations of the RAN device 918 are performed, as described herein. The processor(s) 920 may include one or more baseband processors implemented using, for example, a CPU, a DSP, an ASIC, a controller, an FPGA device, another hardware device, a firmware device, or any combination thereof configured to perform the operations described herein.

The RAN device 918 may include a memory 922. The memory 922 may be a non-transitory computer-readable storage medium that stores instructions 924 (which may include, for example, the instructions being executed by the processor(s) 920). The instructions 924 may also be referred to as program code or a computer program. The memory 922 may also store data used by, and results computed by, the processor(s) 920.

The RAN device 918 may include one or more transceiver(s) 926 that may include RF transmitter and/or receiver circuitry that use the antenna(s) 928 of the RAN device 918 to facilitate signaling (e.g., the signaling 934) to and/or from the RAN device 918 with other devices (e.g., the wireless device 902) according to corresponding RATs.

The RAN device 918 may include one or more antenna(s) 928 (e.g., one, two, four, or more). In embodiments having multiple antenna(s) 928, the RAN device 918 may perform MIMO, digital beamforming, analog beamforming, beam steering, etc., as has been described.

For a RAN device 918 that is a terrestrial base station, one or more of the transceiver(s) 926 and/or the antenna(s) 928 may instead be present on a satellite gateway associated with the base station (e.g., as shown in reference to the terrestrial base station 104 and the satellite gateway 106 of FIG. 1). For a RAN device 918 that is a satellite base station, the transceiver(s) 926 and/or the antenna(s) 928 may be present on the satellite, and one or more of those antenna(s) 928 may be antenna(s) appropriate for satellite communication (such as a moving parabolic antenna, an omni-directional phased-array antenna, etc.)

The RAN device 918 may include one or more interface(s) 930. The interface(s) 930 may be used to provide input to or output from the RAN device 918. For example, a RAN device 918 that is a base station may include interface(s) 930 made up of transmitters, receivers, and other circuitry (e.g., other than the transceiver(s) 926/antenna(s) 928 already described) that enables the base station to communicate with other equipment in a CN, and/or that enables the base station to communicate with external networks, computers, databases, and the like for purposes of operations, administration, and maintenance of the base station or other equipment operably connected thereto.

The RAN device 918 may include a release module 932. The release module 932 may be implemented via hardware, software, or combinations thereof. For example, the release module 932 may be implemented as a processor, circuit, and/or instructions 924 stored in the memory 922 and executed by the processor(s) 920. In some examples, the release module 932 may be integrated within the processor(s) 920 and/or the transceiver(s) 926. For example, the release module 932 may be implemented by a combination of software components (e.g., executed by a DSP or a general processor) and hardware components (e.g., logic gates and circuitry) within the processor(s) 920 or the transceiver(s) 926.

The release module 932 may be used for various aspects of the present disclosure, for example, aspects of FIG. 3 through FIG. 7. The release module 932 is configured to, for example, send to a UE a condition message having a condition for which the UE may send an RRC message comprising a release request, receiving the RRC message, sending an RRC release message to the UE in response, and forwarding assistance information from the RRC message to a CN.

The RAN device 918 may communicate with the CN device 936 via the interface 948, which may be analogous to the interface 828 of FIG. 8 (e.g., may be an S1 and/or NG interface, either of which may be split into user plane and control plane parts).

The CN device 936 may include one or more processor(s) 938. The processor(s) 938 may execute instructions such that various operations of the CN device 936 are performed, as described herein. The processor(s) 938 may include one or more baseband processors implemented using, for example, a CPU, a DSP, an ASIC, a controller, an FPGA device, another hardware device, a firmware device, or any combination thereof configured to perform the operations described herein.

The CN device 936 may include a memory 940. The memory 940 may be a non-transitory computer-readable storage medium that stores instructions 942 (which may include, for example, the instructions being executed by the processor(s) 938). The instructions 942 may also be referred to as program code or a computer program. The memory 940 may also store data used by, and results computed by, the processor(s) 938.

The CN device 936 may include one or more interface(s) 944. The interface(s) 944 may be used to provide input to or output from the CN device 936. For example, a CN device 936 may include interface(s) 930 made up of transmitters, receivers, and other circuitry that enables the CN device 936 to communicate with other equipment in the CN, and/or that enables the CN device 936 to communicate with external networks, computers, databases, and the like for purposes of operations, administration, and maintenance of the CN device 936 or other equipment operably connected thereto.

The CN device 936 may include a release module 946. The release module 932 may be implemented via hardware, software, or combinations thereof. For example, the release module 946 may be implemented as a processor, circuit, and/or instructions 942 stored in the memory 940 and executed by the processor(s) 938. In some examples, the release module 946 may be integrated within the processor(s) 938. For example, the release module 932 may be implemented by a combination of software components (e.g., executed by a DSP or a general processor) and hardware components (e.g., logic gates and circuitry) within the processor(s) 938.

The release module 946 may be used for various aspects of the present disclosure, for example, aspects of FIG. 3 through FIG. 7. The release module 946 is configured to, for example, receive NAS messaging from a UE having a release request and (optionally) assistance information, interrupt a paging (by the CN) of the UE in response to the release request, and resume a paging of the UE according to the assistance information. In some cases, the release module 946 is used to receive a indicate from a RAN device (such as a base station) that the UE has made a release request, and further to receive any assistance information that may have been forwarded to the CN device 936 by the RAN device, such that, e.g., the interruption of paging may be performed. The release module 946 may also be configured to respond (e.g., by resuming a paging of the UE by the CN) to a mobility update message received at the CN device 936 from a UE that was previously out of coverage.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method of a core network (CN), comprising:
receiving, from a user equipment (UE), a release request and assistance information, the release request indicating that the UE is leaving coverage corresponding to the CN;
interrupting a paging of the UE in response to the release request; and
resuming the paging of the UE according to the assistance information.

2. The method of claim 1, wherein the assistance information comprises an outage time duration during which the UE expects to be out of the coverage, and wherein the resuming of the paging of the UE occurs after the outage time duration passes.

3. The method of claim 1, wherein the assistance information indicates that the CN resume the paging after an interruption duration determined by the CN, and wherein the resuming of the paging of the UE occurs after the interruption duration passes.

4. The method of claim 3, further comprising sending, to the UE, the interruption duration.

5. The method of claim 1, wherein the assistance information indicates that the CN should resume the paging after it receives one of a tracking area update (TAU) message and a mobility registration update (MRU) message from the UE.

6. The method of claim 1, wherein the assistance information indicates a location where the UE is likely to be found when it later enters the coverage, and wherein the resuming of the paging of the UE occurs at the location.

7. The method of claim 6, wherein the location is indicated with a global navigation satellite system (GNSS) coordinate.

8. The method of claim 6, wherein the location is indicated with a cell index.

9. The method of claim 1, wherein the assistance information comprises a data treatment preference for the handling of data for the UE while the UE is out of the coverage, and further comprising handling the data for the UE while the UE is out of the coverage according to the data treatment preference.

10. A method of a user equipment (UE), comprising:
   entering a low power usage mode upon leaving coverage corresponding to a core network (CN);
   starting a low power usage mode timer for a wakeup timing for the UE;
   determining, after an expiration of the low power usage mode timer, that the UE has entered the coverage; and
   sending a mobility update message to the CN upon determining that the UE has entered the coverage.

11. The method of claim 10, further comprising indicating that the UE supports a discontinuous coverage power saving mode.

12. The method of claim 10, wherein the determining, after the expiration of the low power usage mode timer, that the UE has entered the coverage comprises continuously checking whether the UE has entered the coverage after the expiration of the low power usage mode timer.

13. The method of claim 10, further comprising receiving, from the CN, a duration for a coverage checking timer; and wherein the determining, after the expiration of the low power usage mode timer, that the UE has entered the coverage comprises checking whether the UE has entered the coverage periodically according to the duration of the coverage checking timer.

14. The method of claim 10, wherein the low power usage mode is one of a power saving mode (PSM) and a mobile initiated connection only (MICO) mode.

15. The method of claim 10, wherein the mobility update message comprises one of a tracking area update (TAU) message and a mobility registration update (MRU) message.

* * * * *